United States Patent [19]
Morelli

[11] 3,971,452
[45] July 27, 1976

[54] AERODYNAMIC DEVICE FOR IMPROVING THE HIGH SPEED RUNNING CONDITIONS OF MOTORCYCLES

[76] Inventor: Alberto Morelli, Strada val Salice, 72, Turin, Italy

[22] Filed: Apr. 29, 1975

[21] Appl. No.: 572,847

[30] Foreign Application Priority Data
May 2, 1974 Italy.................. 68361/74

[52] U.S. Cl. .................. 180/1 FV; 244/42 CA; 280/289 S; 296/15
[51] Int. Cl.² .................................. B62D 37/02
[58] Field of Search........... 180/1 FV, 115; 296/1 S, 296/78.1; 244/42 CA, 42 CB; 280/289

[56] References Cited
UNITED STATES PATENTS

| | | | |
|---|---|---|---|
| 1,353,666 | 9/1920 | Page.............................. | 244/42 CA |
| 2,036,560 | 4/1936 | Backus ............................. | 180/1 FV |
| 3,610,660 | 10/1971 | Price................................... | 280/289 |
| 3,718,345 | 2/1973 | Bringman ...................... | 180/1 FV X |
| 3,768,582 | 10/1973 | Phillippe........................... | 180/1 FV |
| 3,791,468 | 2/1974 | Bryan .............................. | 296/1 S X |
| 3,815,696 | 6/1974 | Larive............................... | 180/1 FV X |
| 3,894,764 | 7/1975 | Powell............................ | 180/1 FV X |

*Primary Examiner*—M. H. Wood, Jr.
*Assistant Examiner*—Terrance L. Siemens
*Attorney, Agent, or Firm*—Flynn & Frishauf

[57] ABSTRACT

An aerodynamic device for improving the high speed running conditions of motorcycles, comprising an airfoil fitted to the motorcycle to produce a negative lifting action approximately in the vertical plane passing through the pivot axle of the front wheel.

16 Claims, 9 Drawing Figures

AERODYNAMIC DEVICE FOR IMPROVING THE HIGH SPEED RUNNING CONDITIONS OF MOTORCYCLES

FIELD OF THE INVENTION

The present invention relates to an aerodynamic device for improving the high speed running conditions of motorcycles.

BACKGROUND TO THE INVENTION

In conventional motorcycles, the aerodynamic action produced by the air stream striking the moving vehicle results in a system of forces applied to its barycentre or centre of gravity G as outlined in FIG. 1 of the accompanying drawings.

Said system of forces consists essentially in a drag R, parallel to the ground, in a lift Z, usually quite a low one equal to about 10% of the drag, and in a pitching moment M, usually a diving one, in consequence of the conditions of movements in the field of air around the motorcycle. In fact, in so far as a conventional motorcycle is concerned, the median line of the air stream appears as a camber LM, indicated by the dash-dot lines in FIG. 1, the fore part of its concavity being turned upwards, the rear part downwards, as a result of the distribution of the pressures on to the ground ahead of and behind the motorcycle, said pressures being positive ahead of and negative to the rear of the vehicle, according to the short-dashed line $p$ rin FIG. 1. In the following specification, the median stream line is considered as an infinitesimal flux tube, capable of producing the same forces as in practice are produced by the movements in the whole field of moving air surrounding the vehicle, i.e., as if the entire capacity of the jet striking the motor vehicle passed through said flux tube. The field of motion, as perturbed by the motorcycle, extends to infinity; yet in practice at a distance from it of the order of its linear dimensions said perturbations are negligible; accordingly, the dimensions of said jet will be considered as twice or three times greater than the linear dimensions of the motorcycle. Since the system of the barycentrical forces considered above resolves into one force only, it is necessary to vertically displace the resistance R by one length $\Delta h = R/M$,
so that said resistance or drag will in consequence be applied at a height $h'$ from the ground where $H' = h \pm \Delta h$, the negative sign being effective if the moment $M$ is a diving one.

Given that $a$ and $b$ are the respective longitudinal distances between the center of gravity G and the axles of the front wheel and the rear wheel, and $p$ is the wheelbase, the load variations in consequence of aerodynamic effects will be as follows:
on the front wheel:

$$\Delta Z_A = Z \frac{b}{p} + R \frac{h'}{p}$$

On the rear wheel:

$$\Delta Z_R = Z \frac{a}{p} - R \frac{h'}{p}$$

Since $h'$ is in general positive and of the order of $\frac{1}{3}p$, $a$ is of the order of $\frac{1}{2}p$ and R much greater than Z ($R \geq 10Z$), $\Delta Z_R$ will be negative and $\Delta Z_A$ positive.

Namely, in a conventional motorcycle, in consequence of the aerodynamic effects, the rear wheel is overloaded while on the contrary the front wheel is lightened, according to about $\Delta Z_A \cong 0.4$ R and $\Delta Z_R \cong -0.3$ R.

This represents a serious inconvenience, since, as is well known, the drag R grows in quadratic relationship to speed according to the following expression:

$$R = C_x S \tfrac{1}{2}\rho V^2,$$

where the product $C_x S$ can be 0.24 in the case of an unstreamlined motorcycle and 0.21 in the case of a streamlined motorcycle.

Accordingly, there exists a critical speed:

$$V_R = \sqrt{\frac{Z_A}{0.2\rho\, C_x S}}$$

at which the load $Z_A$ on the front wheel is overcompensated by the aerodynamic effects and in consequence the motorcycle will tend to turn over backwards, pivoting on the line of contact between the rear wheel and the ground.

Considering as an instance $Z_A = 100$ kg, such a limiting condition takes place at speeds ranging from 450 to 500 km/h. Nevertheless, in the case of riding speeds ranging from $\frac{1}{3}$ to $\frac{2}{3}$ $V_R$, typically attained during competition, a substantial lightening of the front wheel takes place sufficient to seriously compromise the directional stability of the motorcycle.

OBJECTS OF THE INVENTION

Accordingly, the present invention has for its general object the elimination of the above-described disadvantage.

A particular object of the invention is to provide an aerodynamic device able to obviate or to reduce to acceptable values the lightening of the motorcycle front wheel consequent to the above-mentioned aerodynamic effects. A further object of the invention is to provide an aerodynamic device, the employment of which will not produce any increase in the motorcycle drag, any undesirable variations in the rear wheel load, and no influence on the manoeverability of the motorcycle.

BRIEF SUMMARY OF THE INVENTION

In order to attain the above-mentioned as well as further objects which will become apparent from the following detailed specification, the present invention provides an aerodynamic device comprising an airfoil fitted to produce negative lift (P) approximately in a vertical plane passing through the pivot axis of the front wheel. Since said negative lift at the front wheel can also be obtained by a barycentrical diving pitch moment, the airfoil producing the negative lift according to the invention will be placed on a part of the motorcycle such that the aerodynamic force at each point of the airfoil in relation to the barycenter is such as to contribute to said diving moment.

Taking into account that a resistance reaction is produced corresponding to the negative lift (P) produced by the airfoil, the aerodynamic resultant as applied to the pressure centre of the airfoil is sloping in relation to the vertical barycentrical line, according to an angle $\phi$ = arctan $P/R'$, where $R'$ represents the drag of the airfoil and $P$ represents the negative lift produced by the airfoil.

Thus, the airfoil producing the negative lift will be placed on the motorcycle ahead the barycentrical straight line sloping in relation to the vertical at an angle $\phi$, said straight line being the locus of the points of application of the aerodynamic action having a null barycentrical moment.

FURTHER FEATURES OF THE INVENTION

In order to contain the induced resistance within moderate values, the airfoil is shaped with a considerable aspect ratio, and is preferably provided with terminal plates increasing its so-called "effective" aspect ratio.

In order to reduce the overall dimensions, the airfoil can advantageously be constructed of several interconnected members, in such a way to delimit corresponding slots appropriate to generate a slotted flap.

Owing to the fact that, whatever may be the reason, aerodynamic asymmetries can take place (due to manufacturing defects, slipstreams from other vehicles, side winds or the like) in order to prevent any reaction of the airfoil on to the steering, the airfoil will preferably be constrained on the vehicle body.

Furthermore, it will advantageously be dihedral-shaped, more particularly as a negative dihedral, so that in the motorcycle turning phases the relative air speeds, as induced by the rolling movement, are directed according to the half-span of the airfoil, thereby to prevent rolling aerodynamic moments adding to or counteracting the action of the drives in leaning or sloping the vehicle when taking a curve or on coming out of the same. However, if desired said dihedral can be chosen to generate a rolling moment facilitating the sideways sloping of the vehicle (negative dihedral) or to counteract said sideways sloping (flat or null or negative dihedral).

Further features of the invention will appear from the following detailed specification with reference to the accompanying drawings, given by way of non-limitative example.

DESCRIPTION OF EMBODIMENTS

Figure 1:
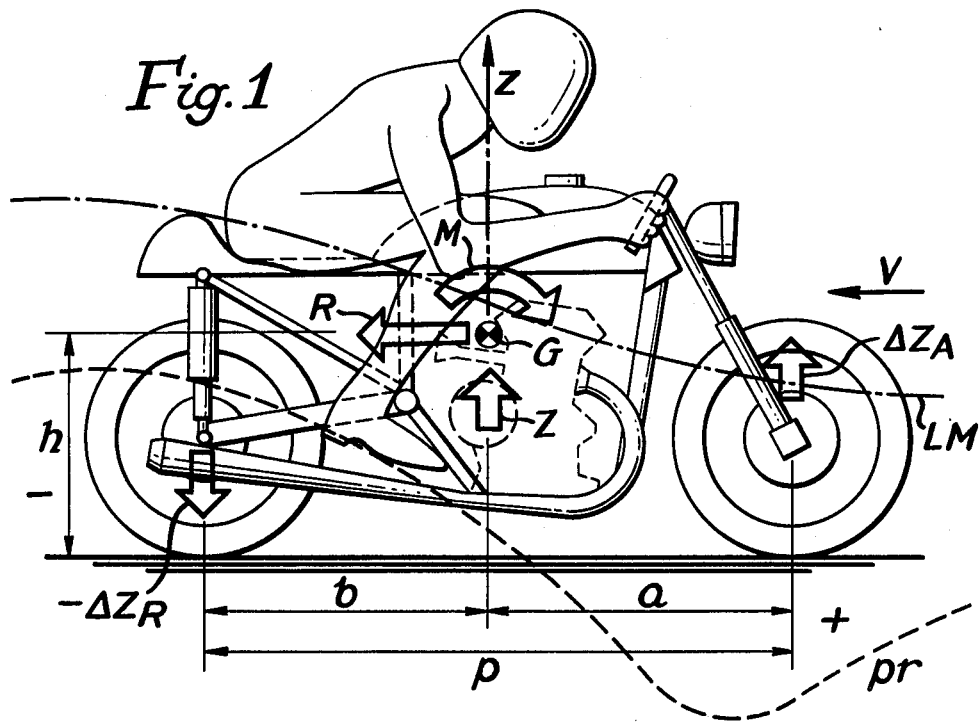
FIG. 1 is the above-mentioned diagram showing the aerodynamic forces as acting on a motorcycle of conventional type, as well as the characteristic parameters considered in the present specification.
Figure 2:
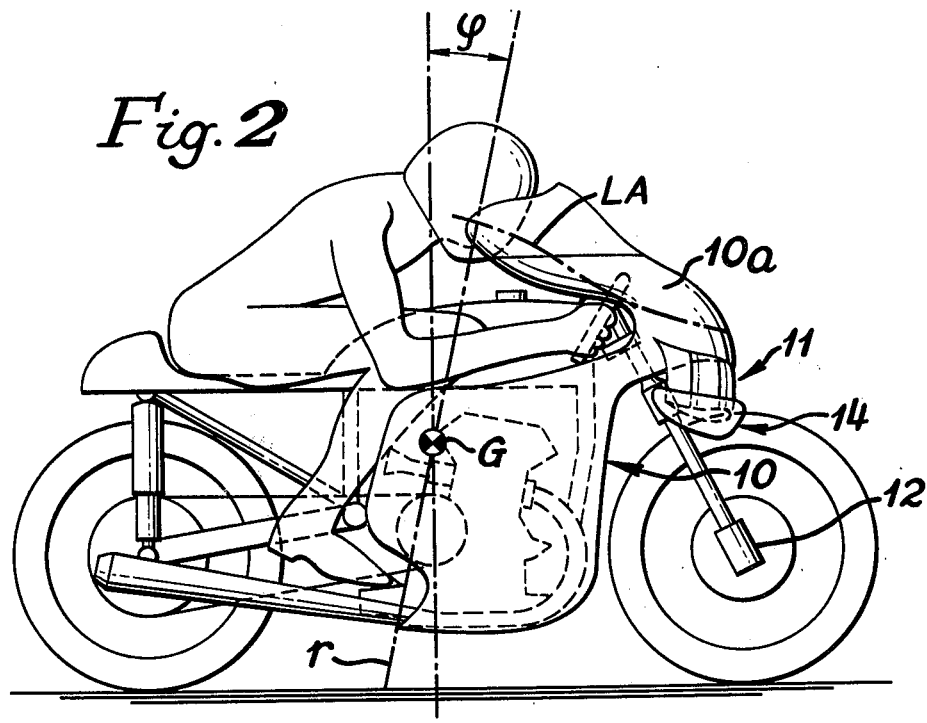
FIG. 2 is a lateral elevation of a motorcycle provided with the aerodynamic device according to the invention.
Figure 3:
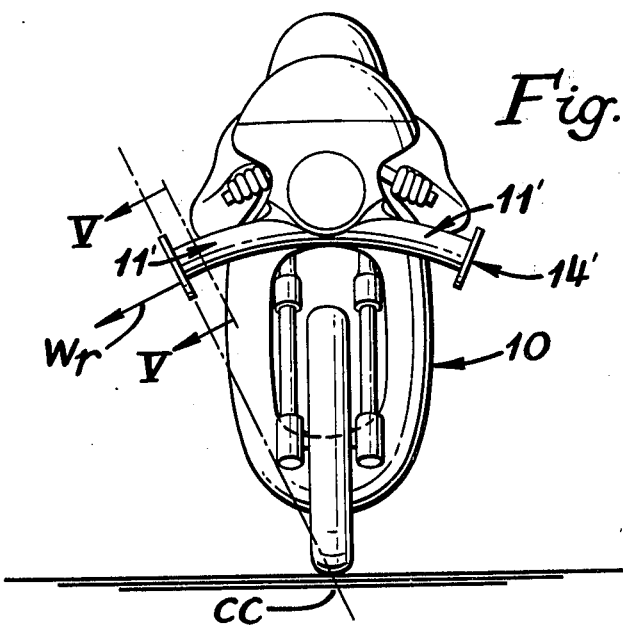
FIG. 3 is a front view of the motorcycle of FIG. 2.

With reference to FIGS. 2 and 3, the reference 10 shows the motorcycle fairing and by the reference 11 is indicated, in a general way, the aerodynamic device according to the invention. The aerodynamic device comprises an airfoil fitted to the vehicle to produce a negative lifting action, approximately on the front wheel axle, in order to reduce or annul the lightening $\Delta Z$ as shown in FIG. 1, consequent to the aerodynamic effects acting on the motorcycle. The airfoil 11 is preferably constrained on the motorcycle structure independently of the fork 12 or, in a more general way, of all steering members, in order to prevent any aerodynamic asymmetries acting on the steering itself.

In the motorcycle provided with a fairing 10, the negative lifting airfoil according to the invention is advantageously constrained at the front end of the fairing aforesaid, above the front wheel. FIG. 2 shows said preferred position, in which the airfoil 11 is placed in alignment with the front tapered fairing zone $10_a$, in the vicinity of the axle of the front wheel and above the same.

Due to the low efficiency of the airfoil in its central zone, owing to the presence of the vehicle body, said fairing is tapered and profiled in such a way that its axial line LA forms a camber — at least in said central zone — the concavity of which is turned upward, in order to originate a negative lift, concomitant with the one of the airfoil.

Figure 6:
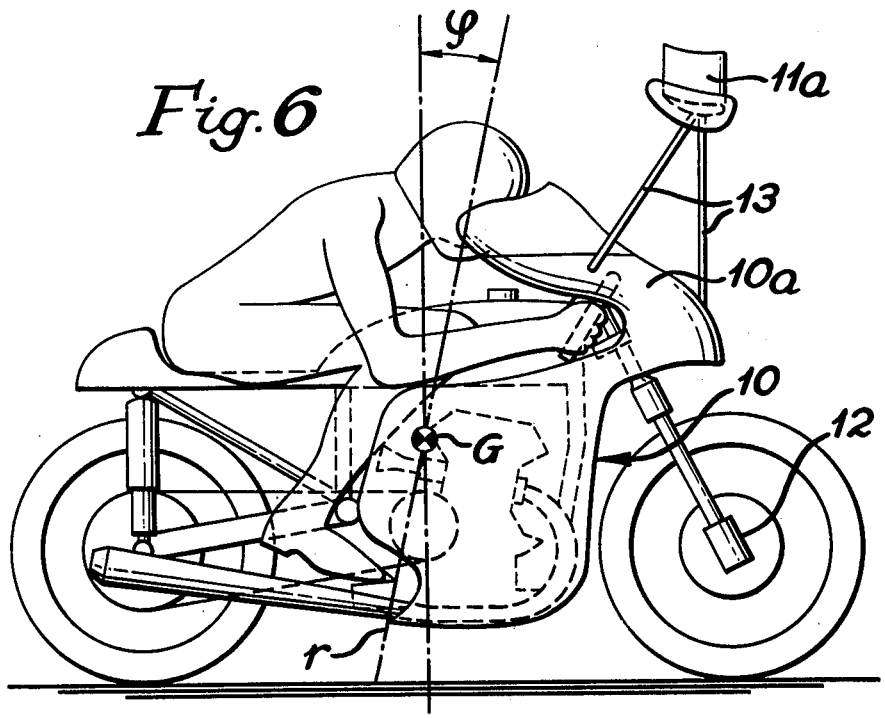
FIGS. 6 and 8 are lateral elevations of a motorcycle of FIG. 2 but with the aerodynamic device mounted in different locations.
Figure 8:
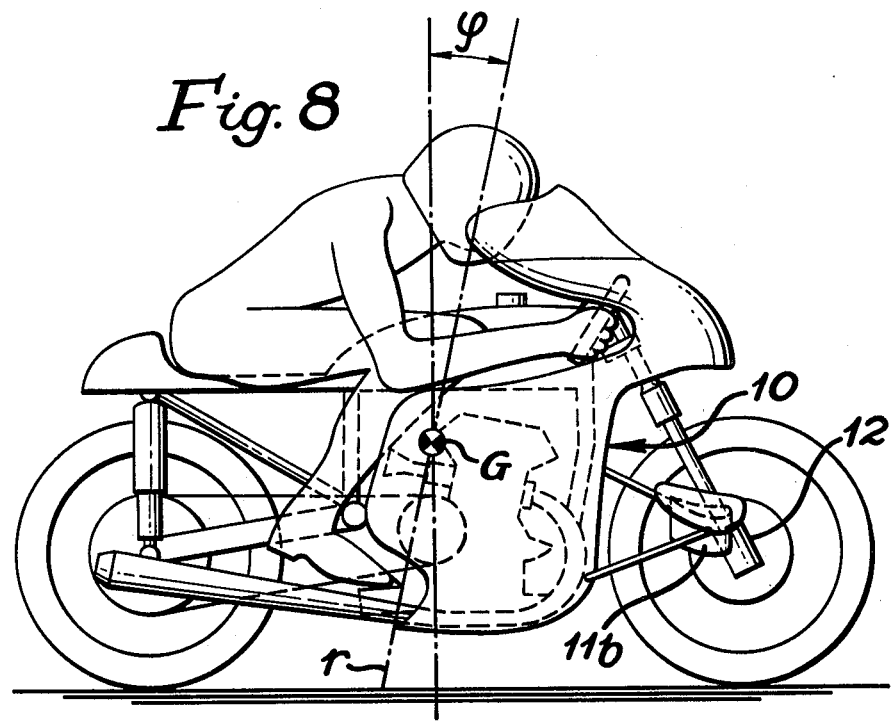

Within the limits of said preferred zone adjacent to the front wheel pivot, the airfoil can be provided, having regard to functional requirements, either above or below the above-mentioned fairing. Accordingly, FIG. 6 shows an example of an airfoil $11_a$ which is supported by means of a bearing linkage 13 above the fairing, and FIG. 8 shows an example of an airfoil $11_b$ which is supported by means of rods or the like, below the fairing.

It is worth noting that the lower position is preferable, on account of the smaller drag moments produced by the reaction resistance. Nevertheless, since a force appropriate to reduce or annul the lightening $\Delta Z_A$ of the front wheel can also be obtained by a pitching barycentrical moment, it suffices that a negative lift airfoil according to the invention is placed in the zone of the motorcycle in which the resultant of its aerodynamic action in relation to the barycentre G is different from zero. On the other hand, a pitching barycentrical moment could be originated by means of a rear bearing airfoil, but such a solution would produce, inconsistently with the object of the invention, a corresponding lightening of the rear wheel, which is detrimental to the realization of the highest motive power produced.

Figure 4:
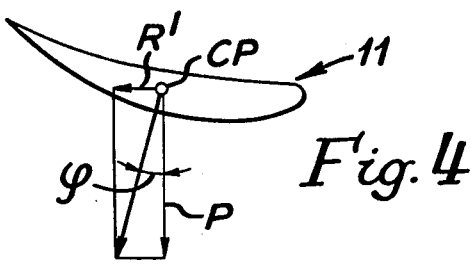
FIG. 4 is a diagram showing the components of the aerodynamic actions produced by the negative lift airfoil.

In consequence, a negative lift airfoil according to the invention is proposed in a leading zone of the motorcycle ahead of the barycentrical straight line $r$ (FIGS. 2, 6 and 8), the locus of the points of application of the aerodynamic actions having a null barycentrical moment. Since to the negative lift P as produced by the airfoil there corresponds to a resistance $R'$, the aerodynamic resultant acting on the airfoil will be inclined at an angle $\phi$ = arctan $P/R'$ (FIG. 4).

Accordingly, if the aileron is placed in such a way in said leading zone of the motorcycle that its pressure center CP is on any point of the inclined barycentrical straight line of $\phi$ in relation to the vertical, the barycentrical moment of the aerodynamic resultant will be null. Accordingly, with respect to the above said barycentrical straight line $r$, the point of application of said aerodynamic forces having a null barycentrical moment will be inclined at an angle $\phi$ = arctan $P/R'$ in which $P$ and $R'$ are respectively the negative lift and the total resistance of the airfoil in point. Since the transverse extension of the airfoil is limited to values of the order of the maximum motorcycle overall dimensions (FIG. 3); and, on the other hand, owing to the considerable negative lifting action required, the aspect ratio of said airfoil cannot exceed the aggregate values at which, also on account of the presence of the motorcycle body, an efficiency will result more than equal to about five. Accordingly, the value corresponding to the trigonometrical tangent of (1/5) is indicated as the highest value of the angle of inclination $\phi$ of the straight line $r$.

In any case, in order to improve the efficiency of the airfoil, while maintaining the traverse overall dimensions within the limit aforesaid, the airfoil 11 is preferably provided with terminal plates 14, having the air of increasing the effective aspect ratio. Furthermore, in order to improve the negative lifting action P, the airfoil will preferably be provided with slotted flaps of corresponding dimensions.

Figure 5:
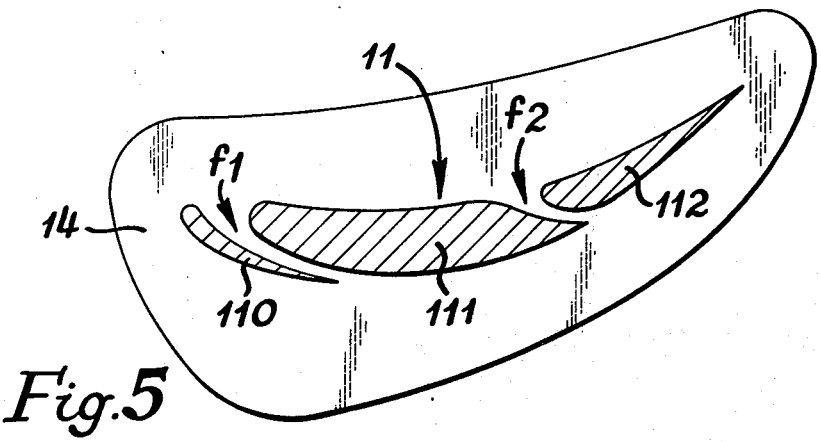
FIG. 5 is an enlarged cross-section on the line V—V of FIG. 3.

In FIG. 5 is illustrated a possible construction of this kind, in which the airfoil comprises three interconnected members 110, 111, 112, delimiting slots $f_1$, $f_2$, appropriate to define the desired flap in a conventional manner.

Figure 7:
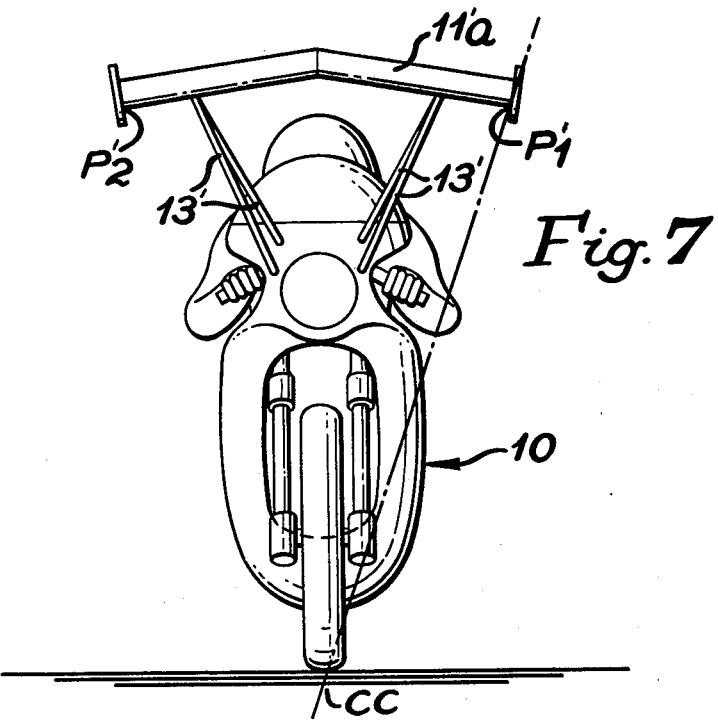
FIGS. 7 and 9 are front views of a motorcycle showing modifications of the embodiment of FIG. 3.

Finally, according to the invention the frontal plane of the airfoil can be either negatively or positively dihedral-shaped. A negative dihedral-shaped airfoil will be employed to the end that the relative air speeds induced during turning (i.e., tilting) phases of the motorcycle are directed according to the half-opening (i.e., half-span) of the airfoil. In this way the formation of rolling moments due to the aerodynamic action are prevented, or are made capable of either contrasting with or adding to the motor vehicle tilting produced by the driver. In order that said conditions are valid at each point of the airfoil, the latter will show an arcuate frontal projection as illustrated by airfoil 11' in FIG. 3. In such a case the camber (or tilting) center CC of the airfoil will coincide with the ground/wheel contact center and the air relative speeds $W_r$, as induced by the rolling motion at each point of the airfoil will be perpendicularly directed to the line joining the above-mentioned tilting center. Nevertheless, for sake of constructional simplicity, a rectilinear semi-aileron could be advantageously employed and arranged as indicated by $11_a'$ in FIG. 7, according to a negative dihedral resulting from planes normal to the lines joining the external points $P_1'$–$P_2'$ of the airfoil with the roll axis.

Figure 9:
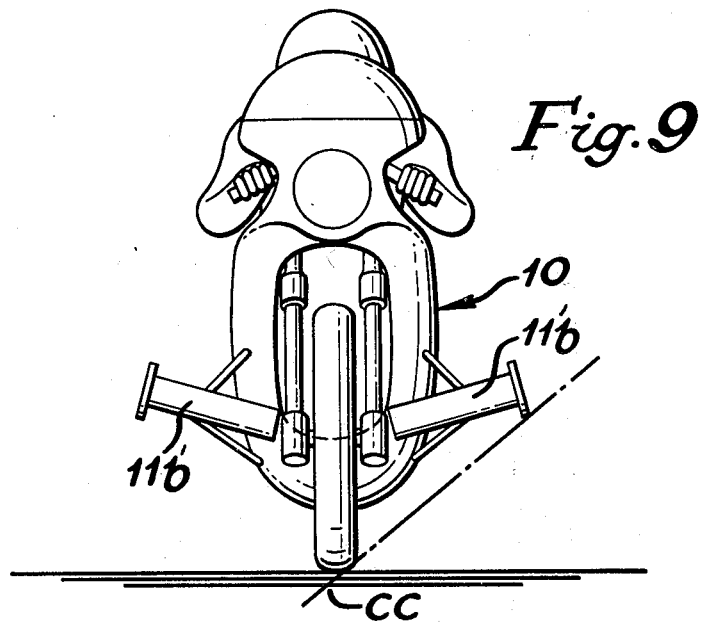

The rolling aerodynamic action originated by the airfoil can also be advantageously employed for either positively or negatively influencing the motorcycle tilting and in such a case the dihedral angle can be a positive one, as indicated by $11_b'$ in FIG. 9, or else a flat or null one. In the main, an airfoil showing a negative dihedral, greater than the one previously mentioned, will originate a rolling moment facilitating the motorcycle tilting; on the contrary, an airfoil showing a flat or positive dihedral will originate a rolling moment tending to counteract the motorcycle tilting.

It is a matter of course that, taking for granted the principle of the invention, the details of carrying out the invention can vary widely in relation to the specification above and accompanying drawings as given by way of non-limitative examples, without departing from the scope of the invention as defined in the appended claims.

I claim:

1. An aerodynamic device for improving the high speed running conditions of motorcycles, comprising a negative lift airfoil constrained on the motorcycle body, independently of any steering member, said airfoil including means to produce a negative lifting action approximately in the vertical plane passing through the pivot axle of the front wheel; said negative lift airfoil being fitted in a leading zone of the motorcycle body ahead of the barycentrical straight line such that said airfoil originates a diving barycentrical moment in relation to the motorcycle's barycenter in every point of said leading zone.

2. A device according to claim 1, wherein said motorcycle has fairing, and wherein said negative lift airfoil is directly mounted on the motorcycle fairing, said fairing having, at least in the zone in which it is constrained to said airfoil, an arcuate axis line the concavity of which is turned upward to originate a negative lift concomitant with that of said airfoil.

3. A device according to claim 1, wherein said motorcycle has a fairing to which said negative lift airfoil is mounted, said negative lift airfoil being mounted in the zone adjacent to the wheel axle and above the motorcycle fairing to which it is constrained, by means of rods.

4. A device according to claim 1, wherein said motorcycle has a fairing to which said negative lift airfoil is mounted, said negative lift airfoil being mounted in the lower zone adjacent to the front wheel axle and below the fairing.

5. A device according to claim 1, wherein said negative lift airfoil is positioned in front of the barycentrical straight line which is inclined in relation to the vertical barycentrical line, at an angle $\phi = \arctan \cdot P/R'$, wherein $P$ and $R'$ respectively represent the values of the negative lift and the total resistance of the airfoil.

6. A device according to claim 5, wherein the limit value of the inclination angle $\phi$ of the barycentrical straight line corresponds to the trigonometric tangent of (1/5).

7. A device according to claim 1, wherein said negative lift airfoil has a limited actual aspect ratio and is provided with terminal plates for increasing the effective aspect ratio.

8. A device according to claim 1, wherein said negative lift airfoil comprises a plurality of interconnected members which delimit slots therebetween.

9. A device according to claim 1, wherein said negative lift airfoil is shaped as a negative dihedral.

10. A device according to claim 9, wherein the dihedral inclination is such that the aerodynamic action induced by a rolling motion of the motorcycle is directed according to the half-opening (or half-span) of the airfoil.

11. A device according to claim 10, wherein said negative lift airfoil has an arcuate frontal projection, the centre of curvature coinciding with the ground/wheel contact centre of the motorcycle.

12. A device according to claim 9, wherein the opening of the airfoil dihedral is such as to originate a rolling moment.

13. A device according to claim 1, wherein said negative lift airfoil is shaped as a positive dihedral.

14. A device according to claim 13, wherein the opening of the airfoil dihedral is such as to originate a rolling moment.

15. A device according to claim 1, wherein said negative lift airfoil is shaped as a null dihedral.

16. A device according to claim 15, wherein the opening of the airfoil dihedral is such as to originate a rolling moment.

* * * * *

UNITED STATES PATENT OFFICE
CERTIFICATE OF CORRECTION

PATENT NO. : 3,971,452
DATED : July 27, 1976
INVENTOR(S) : Alberto MORELLI

It is certified that error appears in the above-identified patent and that said Letters Patent are hereby corrected as shown below:

Column 6, line 31, change "P/R' " to --R'/P--.

Signed and Sealed this

Thirtieth Day of November 1976

[SEAL]

Attest:

RUTH C. MASON
Attesting Officer

C. MARSHALL DANN
Commissioner of Patents and Trademarks